(12) United States Patent
Desai

(10) Patent No.: US 6,236,850 B1
(45) Date of Patent: May 22, 2001

(54) APPARATUS AND METHOD FOR REMOTE CONVENIENCE FUNCTION CONTROL WITH INCREASED EFFECTIVE RECEIVER SEEK TIME AND REDUCED POWER CONSUMPTION

(75) Inventor: Tejas Bhupendra Desai, Sterling Heights, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/227,972

(22) Filed: Jan. 8, 1999

(51) Int. Cl.[7] .................................................. H04B 1/16
(52) U.S. Cl. .................... 455/343; 455/38.3; 455/574; 340/825.54
(58) Field of Search .................. 340/825.54, 825.31, 340/825.69, 825.71, 825.72; 455/38.3, 574, 127, 343, 70

(56) References Cited

U.S. PATENT DOCUMENTS

| | | | |
|---|---|---|---|
| 4,942,393 | * 7/1990 | Waraksa et al. | ................. 340/825.72 |
| 4,961,073 | 10/1990 | Drapac et al. . | |
| 4,964,121 | 10/1990 | Moore . | |
| 5,109,530 | 4/1992 | Stengel . | |
| 5,115,236 | * 5/1992 | Kohler | ................................. 180/14.1 |
| 5,241,542 | * 8/1993 | Natarajan et al. | ................... 370/311 |
| 5,278,831 | * 1/1994 | Mabey et al. | ........................ 370/458 |
| 5,355,518 | 10/1994 | Kindinger et al. . | |
| 5,392,287 | 2/1995 | Tiedemann, Jr. et al. . | |
| 5,440,298 | 8/1995 | Kuramatsu . | |
| 5,448,774 | 9/1995 | Yokozaki et al. . | |
| 5,473,319 | 12/1995 | Asai . | |
| 5,566,081 | 10/1996 | Yoshizawa et al. . | |
| 5,606,728 | 2/1997 | Keba et al. . | |
| 5,744,874 | * 4/1998 | Yoshida et al. | ..................... 307/10.1 |
| 5,767,588 | * 6/1998 | Nakaya et al. | ...................... 307/10.2 |
| 5,838,257 | * 11/1998 | Lambropoulos | ............... 340/825.54 |
| 6,037,675 | * 3/2000 | Yoshida et al. | ..................... 307/10.2 |

* cited by examiner

Primary Examiner—Dwayne D. Bost
Assistant Examiner—Sonny Trinh
(74) Attorney, Agent, or Firm—Tarolli, Sundheim, Covell, Tummino & Szabo L.L.P.

(57) ABSTRACT

A remote convenience system (10), via an associated method, causes remote control performance of a function. A portable, actuatable transmitter (14) of the system (10) transmits signals (16) that convey a function request during first portions of repeating, predetermined duration, request periods, and idles during second portions of the request periods. A receiver/controller (18) of the system (10) performs the requested function, within a response period of predetermined duration that begins upon transmitter actuation, in response to a received function request. Within the receiver/controller (18), power control circuitry (62) maintains receive circuitry (56) in a power OFF state for a first portion of a repeating, predetermined duration, power-save period, and cycles the power ON and OFF in a sequence for a second portion of the power-save period such that the receive circuitry (56) is eventually in the power ON state during one of the first portions of one of the request periods and such that one of the transmitted signals (16) is detected. The power control circuitry (62) maintains the power ON once the signal is detected to receive a next subsequent signal (16).

12 Claims, 6 Drawing Sheets

APPARATUS AND METHOD FOR REMOTE CONVENIENCE FUNCTION CONTROL WITH INCREASED EFFECTIVE RECEIVER SEEK TIME AND REDUCED POWER CONSUMPTION

FIELD OF THE INVENTION

The present invention relates to remote convenience systems, and is particularly directed to a system in which the time that a receiver seeks a transmitted signal is effectively increased while power consumption is reduced.

BACKGROUND OF THE INVENTION

Remote convenience systems are known in the art. Such remote convenience systems permit remote control of certain functions. One example type of a remote convenience system is for remotely controlling vehicle functions. Other example types of remote convenience systems include garage door opener systems and entry light activation systems.

Focusing now on the remote convenience vehicle systems, examples of remotely controlled functions include locking and unlocking of one or more vehicle doors. A remote convenience vehicle system that permits remote locking and unlocking functions is commonly referred to as a remote keyless entry ("RKE") system.

Such remote convenience vehicle systems may provide for control of other vehicle functions. For example, remote engine start and remote door open functions are known. Another example of a remote convenience function is a vehicle locator function. For the vehicle locator function, the vehicle horn is actuated to emit a horn chirp and/or the headlights of the vehicle flash to allow a person to quickly locate their car within a crowded parking lot.

Known remote convenience vehicle systems include a receiver mounted in an associated vehicle and at least one portable hand-held transmitter located remote from the receiver. The receiver has a memory that stores one or more security codes, each of which is associated with a transmitter that is authorized to cooperate with the receiver mounted in the vehicle. Each transmitter is provided with one or more manually actuatable switches. Each switch is associated with a vehicle control function to be performed.

Within each transmitter, circuitry is provided that is responsive to switch actuation to transmit a message in the form of a digital signal. The transmitted signal includes the appropriate security code and is intended for reception by the receiver. Upon reception of the signal by the receiver, the security code portion of the received signal is compared against a stored security code by an actuation controller. If the security codes match, the received command message is decoded by the actuation controller. In turn, the controller directs performance of the requested function.

The portable transmitters operate in the ultrahigh frequency ("UHF") portion of the radio frequency ("RF") spectrum. Specifically, the remote transmitters operate in the portion of the RF spectrum that is allocated by the Federal Communications Commission ("FCC") for unlicensed transmission devices. FCC regulations stipulate that such unlicensed devices can not have a transmitted signal strength that exceeds a stipulated maximum value.

It is desirable to have a system that provides consistent performance within a certain range. It is also often desirable to accomplish remote control performance of certain functions at a longest possible distance.

As mentioned above, FCC regulations prevent a direct, overall increase in the transmitted signal strength. However, FCC regulations permit an increased instantaneous signal strength of a transmitted signal based upon an average strength within a transmission window. One approach to maintaining a predetermined average strength is to associate a certain amount of "dead time" with each signal transmission. In one example, for a 100-millisecond period, the dead time can be 45 milliseconds or greater. Thus, transmission only occurs during time portions that add-up to 55 milliseconds (or less) within the 100-millisecond period. In one example, the transmitter emits the signal for a short time period (e.g., 22.5 milliseconds), idles for a short time period (e.g., 27.5 milliseconds), and then repeats the transmission/idle sequence.

Turning now to the receiver within the remote convenience system, the receiver must have a very low power draw. One reason for the low power requirement is that the receiver relies on power provided by a battery of the vehicle within which the receiver is located. If the vehicle is inactive for a very long time period while the receiver is "ON", sufficient power could be drained from the battery to effect other operational functions of the vehicle (i.e., starting of the vehicle after the long idle period). One approach to reducing the power consumption of the receiver is to turn the receiver "OFF" for a period of time.

A typical ON/OFF schedule for a remote convenience system receiver is such that the receiver is ON less than 10 percent. In one example, the receiver is ON for 50 milliseconds and OFF for 450 milliseconds. However, in order for the receiver to receive a signal, the receiver must be "ON" (i.e., seeking or "listening" for such a signal) during at least one of the transmissions of the signal. It is possible for many transmission signals to occur while the receiver is OFF.

A receiver in a remote convenience system must also respond to a transmitted signal without excessive delay. A typical response time is desired to be less than one-half second. In other words, when a vehicle operator actuates a button on a hand-held transmitter, the operator expects the function (i.e., unlock the doors) to be performed within a relatively quick time period.

Circuitry within a known receiver has a start-up time period (e.g., stabilization of bias points and setting of threshold levels) when the receiver circuitry is turned "ON" after the long OFF time period. During the start-up period, the power is ON, but the receiver is not yet fully operational to detect/receive signals. A typical start-up time for a receiver takes approximately 20 milliseconds.

A worse case scenario for response time occurs when a transmitter operator actuates the transmitter at the beginning of a receiver "OFF" period (e.g., a 450-millisecond OFF period). During the worse case scenario, all of the signals transmitted during the receiver OFF time are not received. Also, during the receiver start-up time (20 milliseconds), the transmitted signals are not received. Thus, only 30 milliseconds remain within the half-second period within which the receiver can respond and still be within the expected half-second time frame for function performance after transmitter actuation. If the transmitted signal has a "dead time" that is greater than 30 milliseconds and that dead-time overlays the final 30 milliseconds of the half-second period (recalling that dead-time is used to increase transmission signal strength while maintaining an average transmission signal strength), the transmitted signal is not be received (i.e., picked-up or "caught") by the receiver and the one-half second time period is exceeded.

Accordingly, it should now be appreciated that the desire to have a relatively large dead time associated with transmission of signals and the desire to have a relatively low power consumption for the receiver pose a conflict when taken in the context of the desired response time window.

SUMMARY OF THE INVENTION

In accordance with one aspect, the present invention provides a remote convenience system for remote control of a function. The system includes a portable, actuatable transmitter for requesting performance of a remote control function. The system also includes a receiver/controller for causing performance of the requested function, within a response period of predetermined duration that begins upon transmitter actuation, in response to a received function request. The transmitter including means for transmitting signals conveying a function request during first portions of repeating, predetermined duration, request periods and for idling during second portions of the request periods. The receiver/controller includes receiver means having an ON state for detecting and receiving transmitted signals and an OFF state. The receiver/controller also includes power control means for maintaining the receiver means in the OFF state for a first portion of a repeating, predetermined duration, power-save period. The power control means also cycles the receiver means between the ON and OFF states in a sequence for a second portion of the power-save period such that the receiver means is eventually in the ON state during one of the first portions of one of the request periods of the transmitter, and such that one of the transmitted signal is detected. Further, the power control means maintains the receiver means in the ON state once the receiver means detects a signal such that a next subsequent signal is received and the requested function performed within the response time period.

In accordance with another aspect, the present invention provides a method of remotely controlling a remote convenience function. Within the method, performance of a remote control function is remotely requested. The remote request includes transmitting signals that convey a function request during first portions of repeating, predetermined duration, request periods and idling during second portions of the request periods. A receiver means is maintained in a power OFF state for a first, predetermined portion of a repeating, predetermined duration, power-save period. Power of the receiver means is cycled ON and OFF in a sequence for a second, predetermined portion of the power-save period such that the power of the receiver means is eventually ON during one of the first portions of one of the request periods. The presence of a signal is detected when the power of the receiver means is eventually cycled ON during one of the first portions of one of the request periods. The power of the receiver means is maintained ON in response to the detection, such that a next subsequent signal is received. The requested function is caused to be performed within a predetermined duration response period that begins at the beginning of the signal transmission.

BRIEF DESCRIPTION OF THE DRAWINGS

The foregoing and other features and advantages of the present invention will become apparent to one skilled in the art to which the present invention relates upon reading the following description of the invention with reference to the accompanying drawings, wherein.

DESCRIPTION OF PREFERRED EMBODIMENT

Figure 1:
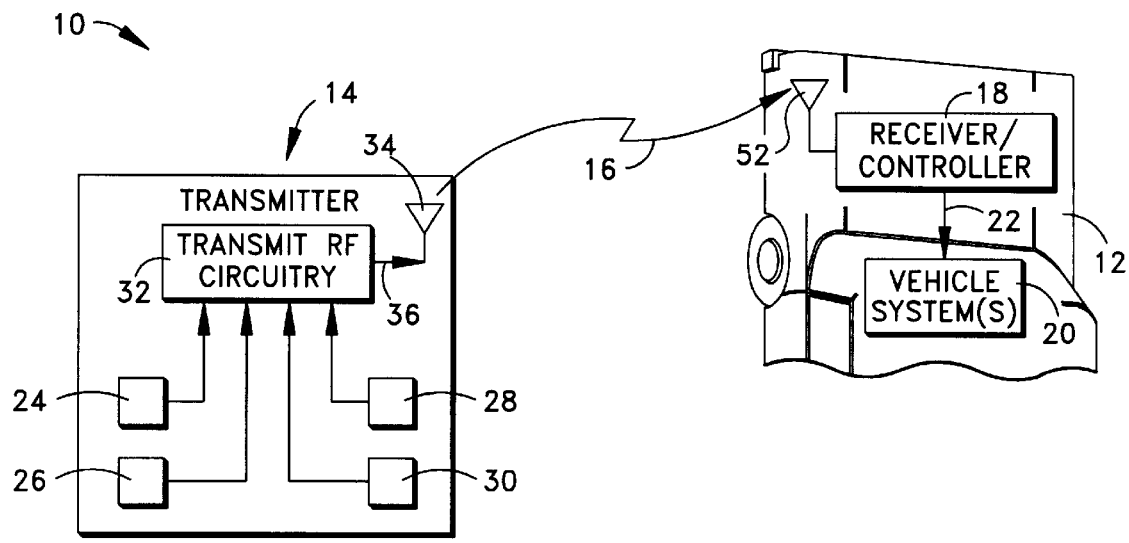
FIG. 1 is a schematic illustration of a remote convenience vehicle system, in accordance with the present invention, and an associated vehicle.

A preferred embodiment of a remote convenience system 10 in accordance with the present invention is schematically shown in FIG. 1, along with an associated vehicle 12. The system 10 includes one or more remote transmitter units 14 (only one shown in FIG. 1, and hereinafter referred to as "transmitter") that communicate, via a signal 16, with a vehicle-mounted receiver/controller unit 18 (hereinafter "receiver/controller") to achieve remote control of at least one vehicle system 20.

Preferably, the transmitter 14 can transmit any of several command signals 16 to the receiver/controller. The signal 16 contains a message that requests performance of a certain function. Upon receipt of an authorized signal 16 by the receiver/controller 18, the receiver/controller provides a function request signal 22 to the appropriate vehicle system 20.

In one example, the vehicle system 20 is the door lock driver circuits for locking and unlocking the vehicle doors. It will be appreciated that the present invention can be employed for other vehicle systems 20 that have other remote control functions (e.g., trunk release, door open, vehicle find). Also, it will be appreciated that other embodiments of the present invention may have other remotely controlled functions (e.g., garage door opening or entry light activation).

The transmitter 14 is, in accordance with the present invention, a portable, hand-held unit that has a housing that encloses its electronic components. Typically, the transmitter 14 is of a size that allows its attachment to key chain, via a key chain attachment ring. The transmitter 14 includes at least one manually operable pushbutton switch. In the example shown in FIG. 1, there are four pushbutton switches 24–30.

Each actuation, or predefined series of actuations, of one of the pushbuttons (e.g., 24) of the transmitter 14 corresponds to a predefined remote function request. For example, the first pushbutton 24 may be associated with a request to lock vehicle doors and the second pushbutton 26 may be associated with a request to unlock the vehicle doors. The third pushbutton 28 may be associated with the trunk release function and the fourth pushbutton 30 may be associated with the vehicle find function. It is to be appreciated that the system could be configured to control different remote convenient functions and that the transmitter structure (e.g., the number and type of pushbuttons on the transmitter) would be accordingly different.

The pushbuttons 24–30 are operatively connected to transmit radio-frequency (RF) circuitry 32 within the transmitter 14. The transmit RF circuitry 32 is, in turn, operatively connected to a broadcast transmission antenna 34. In response to pushbutton actuation the transmit RF circuitry 32 generates/assembles a "packet" of information to be conveyed via the transmitted signal 16. The transmission packet includes at least one command that represents the remote function request, and a security code. The transmit RF circuitry 32 then provides an appropriate electrical signal 36 that conveys the transmission packet to the antenna 34. In response to the stimulus of the electrical signal 36, the antenna 34 broadcasts the signal 16, which is intended to be received by the receiver/controller 18 at the vehicle 12.

The signal 16 (FIG. 2) is preferably a serially transmitted, digital signal. Also, preferably, the signal 16 has a plurality of carrier-frequency pulses 42. Each pulse 42 (FIG. 3) is comprised of an oscillating frequency 44 that is ON for a controlled time period to define a pulse. Specifically, as shown in FIG. 3, the signal 16 is steady state outside of a pulse 42 and oscillates within the pulse. Preferably, the frequency of the oscillation is in the radio-frequency range. Each pulse 42 within the signal 16 represents either a binary one or a binary zero. Binary one and binary zero are distinguished from each other by a difference in length or duration "d" of the pulse 42. The digital pulses are grouped to convey the message packet components, such as a start portion 46 (FIG. 2), a security code 48, and a function command 50.

For each function request (i.e., pushbutton actuation by a transmitter operator), the transmitter 14 (FIG. 1) cycles between signal transmission and idle (i.e., non-transmission) periods for a length of time. In one example, the transmission/idle sequence continues for a time between one-half second and one second. During the cycling time, the transmit RF circuitry 32 alternates between providing the signal 36 and not providing the signal 36. In the example shown in FIG. 4, the signal transmission or ON period has a 17.3 milliseconds duration and the idle or OFF period has a 36.9 milliseconds duration. Thus, the transmitter 14 is transmitting only approximately 32 percent of the time.

Figure 2:
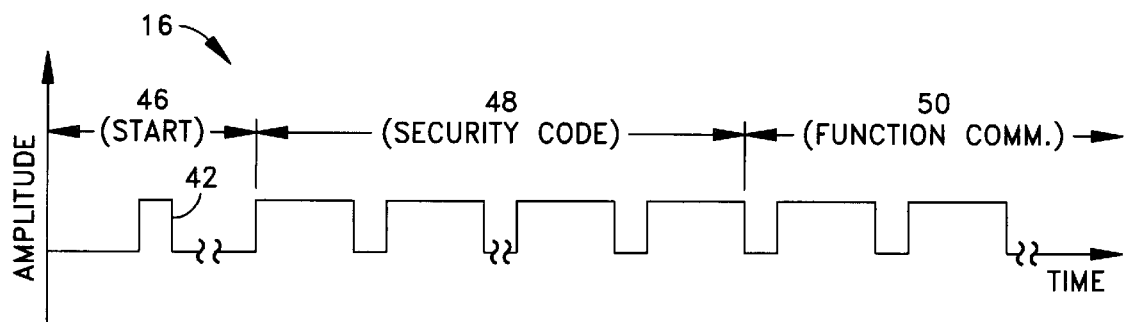
FIG. 2 is an illustration of a waveform showing a message packet of a transmitted signal.
Figure 3:
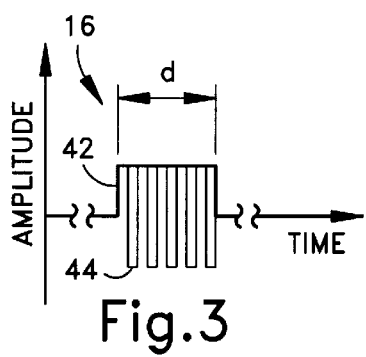
FIG. 3 is an illustration of a signal portion at a frequency.
Figure 4:
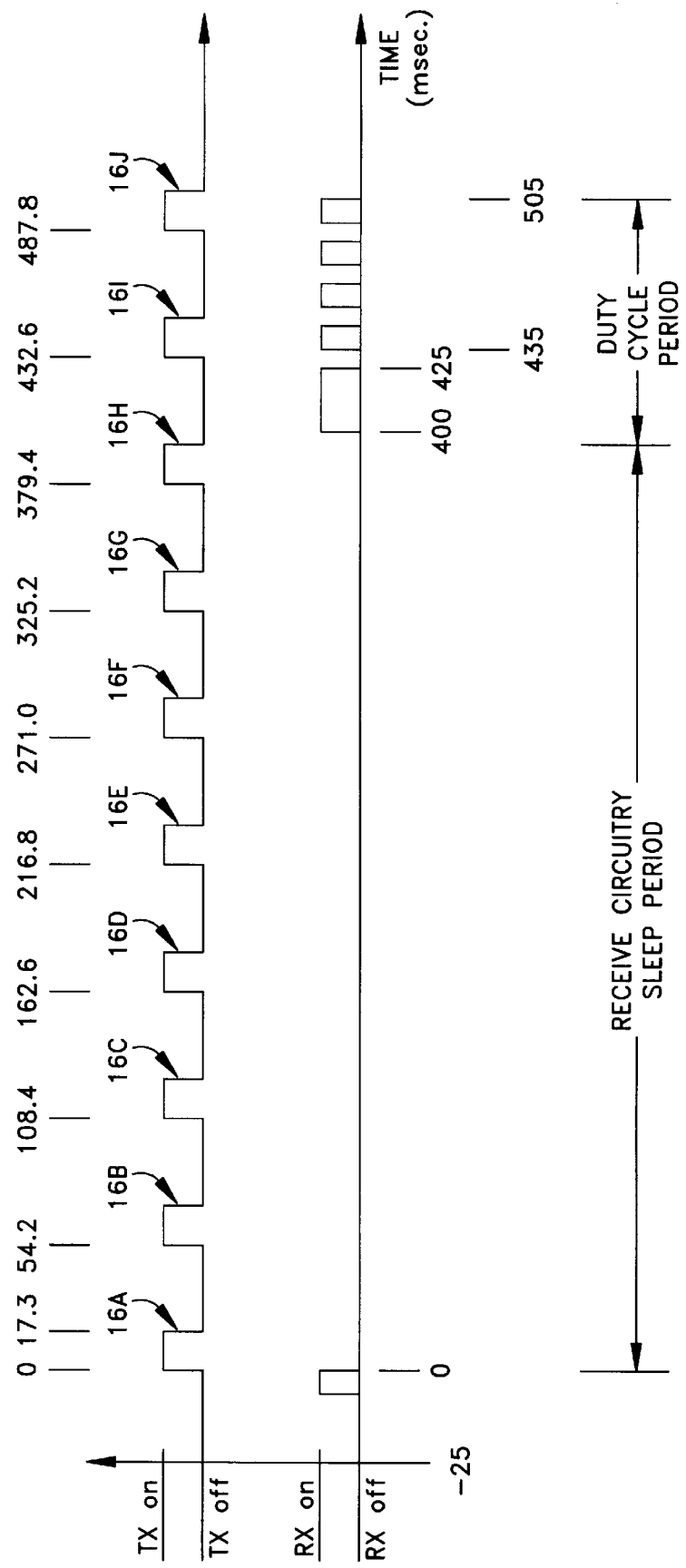
FIG. 4 is an example of a time plot for signal transmission and receiver duty cycling in accordance with the present invention.

It is to be noted that each ON period shown in FIG. 4 represents an entire signal (e.g., 16A), and that these ON periods are not to be confused with the digital pulses of FIGS. 2 and 3. A digital pulse signal, such as shown in FIG. 2, occurs during each ON period (FIG. 4) of the transmitter 14. All of the signals 16A–16J are identical (i.e., repeating). Moreover, each of the plurality of signals 16A–16I are intended for reception by the receiver/controller 18 (e.g., carrier frequency is unchanged, a suitable security code is present in each signal).

For ease of discussion hereinafter, the signals are referenced collectively or generically by the numeric designation 16 for discussions that are applicable to all of the signals or are generic to all of the signals. The signals are referenced specifically using the alphabetic suffix (e.g., 16A) for discussions that are specific to a particular signal.

The transmitter 14 (FIG. 1) and its components are of suitable structure and designed to accomplish the transmission of the signals 16 and the transmission/idle sequence. Further, the structure and design of the transmitter 14 and its components may be of any known structure and design. Thus, specifics of the transmitter 14, and its components, are not discussed herein for brevity.

Figure 5:
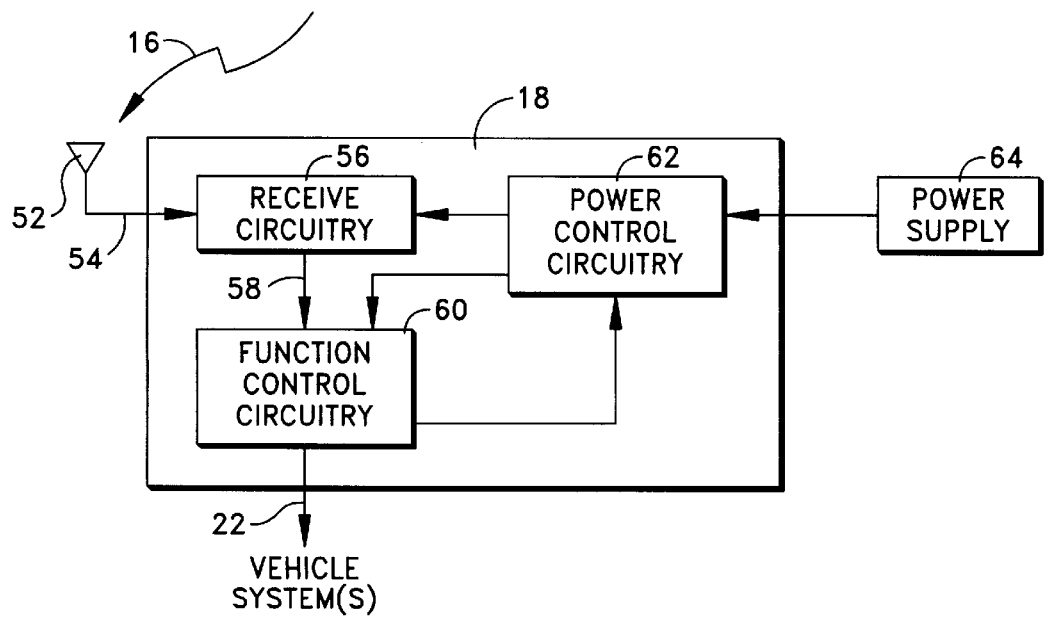
FIG. 5 is a function block diagram of a receiver/controller of the system of FIG. 1.

At the vehicle 12, an antenna 52 is operatively connected to the receiver/controller 18. The antenna 52 (FIG. 5) is tuned to "pick-up" the signal 16 and, in response to the signal, outputs an electrical signal 54 to receive circuitry 56 within the receiver/controller 18. The electrical signal 54 conveys the contents (i.e., the message packet containing the function command and the security code) of the signal 16. An output 58 of the receive circuitry 56 conveys the message packet contents.

Function control circuitry 60 is operatively connected to the receive circuitry 56 for receiving the message packet and processing the information contained therein. Preferably, the function control circuitry 60 includes a microprocessor for processing the information to determine if the security code from the message packet is valid, and to determine the vehicle function that is being requested. Also preferably, a memory of the function control circuitry 60 includes temporary storage capability (i.e., random access memory or "RAM"), and permanent storage capability (i.e., read only memory or "ROM"). One item stored within the permanent memory is a security code.

Power control circuitry 62 is operatively connected to the receive circuitry 56 and the function control circuitry 60. The power control circuitry 62 is also connected to a power supply 64 of the vehicle 12 (e.g., a battery of the vehicle). The power control circuitry 62 is operable to provide power to the receive circuitry 56 in (1) a regular, full "ON" power consumption scenario, (2) a low-level or "sleep" scenario, and (3) a duty-cycling scenario. The power control circuitry 62 is also operable to provide power to the function control circuitry 60 in (1) a regular, full "ON" power consumption scenario or (2) a low level "sleep" scenario.

The power control circuitry 62 provides the regular, full ON supply of electrical power to the receive circuitry 56 when the receive circuitry is actively involved in receiving the transmitted signal 16. Specifically, all of the components of the receive circuitry 56 are energized with suitable energy to perform their intended function(s). The power control circuitry 62 provides the regular, full ON supply of electrical power to the function control circuitry 60 when the function control circuitry is actively involved in processing information from a received signal 16 and controlling performance of a remotely requested function at the appropriate vehicle system 20.

Specifically, during such regular, full ON operation, the antenna 52 picks up the signal 16 and provides the electrical signal 54 to the receive circuitry 56. The receive circuitry 56 outputs the information to the function control circuitry 60. Within the function control circuitry 60, the security codes are compared. If the security codes match, the function control circuitry 60 determines what remote convenience function is being requested via the signal 16, and the function control circuitry provides the appropriate function request signal 22 to the appropriate vehicle system 20.

It is to be appreciated that most of the time, the receiver/controller 18 is not receiving a signal 16 and is not controlling a vehicle system 20, but is instead waiting for the occurrence of a transmitted signal 16. During the waiting period, power consumption of the receiver/controller 18 is relatively low, in accordance with the present invention. Specifically, the power control circuitry 62 provides power to the function control circuitry at the sleep level (i.e., some non-essential components are disabled and/or non-essential functions are not performed).

During the signal waiting period, the receive circuitry 56 receives electrical power in a cyclic pattern of (1) sleep level and (2) duty cycling. During the sleep level of power supply, the receive circuitry 56 is effectively turned OFF. During duty cycling, the electrical energy is alternately turned ON and OFF for relatively short, predetermined time periods.

During the short ON periods, the receive circuitry 56, briefly "listens" for RF activity that is indicative of the presence of the signal 16. Specifically, the receive circuitry 56 "listens" for RF activity at the tuned frequency of the receiver/controller 18.

When the receive circuitry 56 detects the presence of the signal 16, the receive circuitry communicates with the function control circuitry 60. In response to the communication, the function control circuitry 60 communicates with the power control circuitry 62, and instructs the power control circuitry to provide full ON power. Thus, the receive circuitry 56 and the function control circuitry 60 are fully powered and operational to receive and process the next signal.

It is to be appreciated that when the supply of electrical energy for the receive circuitry 56 is OFF for a sufficient time (i.e., such as toward the end of a sleep time period), operational levels such as electronic bias points and threshold levels decay sufficiently from typical levels to be effectively zero. Also, when power is turned ON, a certain amount of time is needed for the operational levels to be reached and to stabilize. During duty cycling, the power OFF periods are sufficiently short to prevent complete decay of the operational levels. Thus, during duty cycling, once the operational levels are initially attained, the operational levels are quickly re-attained for each subsequent power ON period.

Turning again to the issue of saving energy, both sleep and duty cycling result in reduced power consumption compared to the regular, full ON level of power consumption. But, it is to be noted that sleeping and duty-cycling is performed in a manner that does not interfere with the expectation of relatively quick response time (i.e., the remotely requested function should be performed within one-half second after transmitter activation). The receiver/controller 18 of the present invention provides for such requirements. Specifically, the receiver/controller 18 goes to a regular, full ON operation to receive the signal 16 and execute the requested function within the expected time.

The energy supply patterns for the receive circuitry 56 that occur during the signal waiting period are shown in FIG. 4. In the illustrated example, the sleep period exists from time equals zero to time equals 400 milliseconds. Accordingly, the sleep time period has a 400-millisecond duration.

The duty cycling time period has a 105 milliseconds duration. In the illustrated example, the duty cycling occurs from time equals 400 milliseconds to time equals 505 milliseconds. The duty cycling time period begins with the power control circuitry 62 providing energy to the receive circuitry 56 for 25 milliseconds. Thereafter, for the remainder of the duty cycling period, the power control circuitry 62 turns the power OFF for 10 milliseconds and ON for 10 milliseconds in an alternating pattern. Thus, the duty cycling period has a power ON period for the first 25 milliseconds; followed by four 10 second power ON intervals, each separated by 10 milliseconds of OFF time.

In one example, the receive circuitry 56 is such that the start-up time for proper operation requires at least 20 milliseconds of power from the point of initial power-up. In other words, the components require 20 milliseconds (see the shaded portion of the 25 millisecond ON period in the example of FIG. 6) of power before the bias points stabilize, the threshold levels are set, and the like. Thus, during the initial 25-millisecond ON period (i.e., after the relatively long power OFF sleep period), the receive circuitry 56 is effectively inoperative for the first 20 milliseconds. During the last 5 milliseconds of the 25-millisecond period, the receive circuitry 56 is operable and seeks the transmitted signal 16 (i.e., "listens" for the signal). At the end of the 25-millisecond period, the power is turned OFF, and the receive circuitry 56 ceases to seek the transmitted signal.

The duty cycle OFF time periods are relatively short in duration (i.e., only 10 milliseconds), thus, the state of the components within the receive circuitry 56 do not decay significantly. Specifically, bias points and threshold levels do not decay significantly within each 10-millisecond OFF period. When the receive circuitry 56 is again powered ON by the power control circuitry 62, the components only require 5 milliseconds (shown by the shaded portion of the 10 millisecond ON periods in FIG. 6) of power ON to re-stabilize. Thus, within each of the 10-millisecond power ON periods, the first 5 milliseconds are a re-stabilization portion, in which the receive circuitry is fully operation (i.e., not seeking the presence of the transmitted signal 16). However, in the last 5 milliseconds of each of the power ON portions, the receive circuitry 56 actively seeks the presence of the transmitted signal 16.

At the end of the 105-millisecond duty cycle period, the power control circuitry 62 again places the receive circuitry 56 into a sleep mode. Within the sleep mode, the state of the components decay significantly such that at the beginning of a subsequent duty cycle period, a new 25-millisecond power ON period is required.

Turning now again to the example shown in FIG. 4, it is to appreciated that the signals 16A–16H are not received by the receiver/controller 18 because the receiver/controller is in its sleep mode. However, the presence of the signal 16I will be detected because at least a portion of the signal 16I occurs when the receive circuitry 56 is duty-cycled ON and stabilized. In response to detection of the signal 16I, the receiver/controller 18 is fully operational for receipt and processing of the signal 16J. It should be noted that FIG. 4 is drawn to illustrate the duty-cycle timing of the receive circuitry 56. In actuality, when the signal 16I is received, the duty cycling would cease in favor of full ON power.

It should be appreciated that FIG. 4 illustrates what can be referred to as a worst case scenario. Specifically, as shown in FIG. 4, the last power ON period of a duty cycling segment for the receive circuitry 56 ends at time equal zero. At time equal zero, the transmitter 14 is actuated and the transmissions of the signals begin. Thus, the first several signals 16A–16H are transmitted during the sleep mode of the receiver/controller 18. It is not until the time of signal 16I that the receive circuitry 56 is in its duty cycling time period and the signal 16I is "picked-up" by the duty cycling receiver/controller 18. It is to appreciated that if the transmitter 14 is actuated at some time greater than zero, the response time between transmitter actuation and performance of the requested function would be shorter because an earlier signal (e.g., 16E) would be detected.

Figure 6:
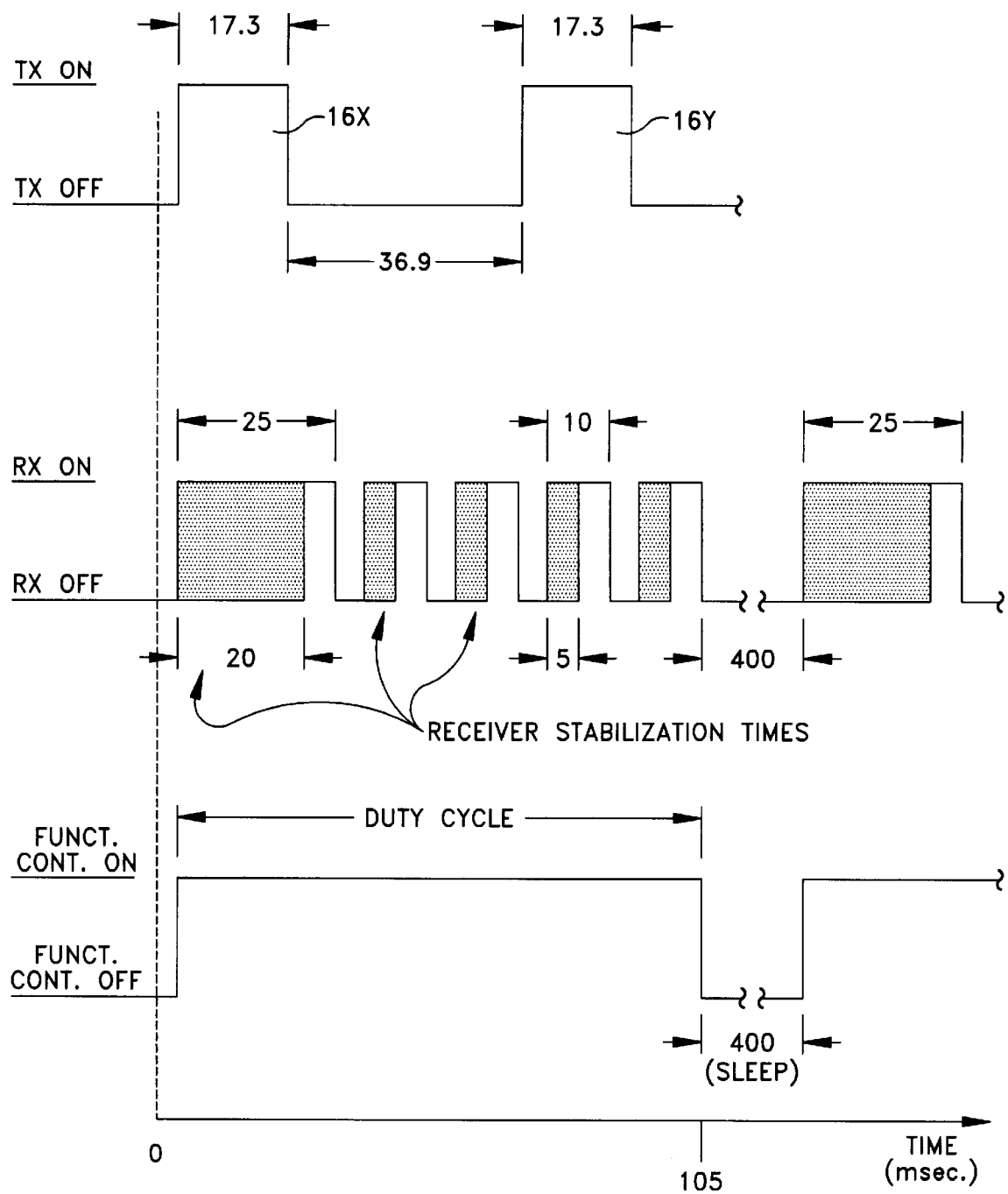
FIG. 6 is an illustration showing ON and OFF periods for portions of the receiver/controller and for a transmitter outputting a signal at a first transmission/dead-time period.

As is shown by the example of FIG. 6, because of the selected time periods of the transmitted signal (i.e., signal duration and associated dead time), and the duration and spacing within the duty cycle period of the receiver, one of the transmitted signals 16 eventually coincides with a "listen" portion of the duty cycling (i.e., the transmission ON time coincides with one of the 5 millisecond segments at the end of one of the power ON periods). Thus, the receive circuitry 56 detects the presence of the signal 16.

In response to detecting the signal 16 (FIG. 5), the receive circuitry 56 provides an appropriate signal to the function control circuitry 60. In turn, the function control circuitry 60 causes the power control circuitry 62 to provide a full power ON power supply to the receive circuitry 56 and to the function control circuitry. Accordingly, the receive circuitry 56 is ON when the next, subsequent transmitted signal occurs. The receive circuitry 56 can thus provide the complete message to the function control circuitry 60 for decoding and action thereupon.

The eventual and timely detection of the signal 16 occurs regardless of when the transmitter 14 is activated during the receiver/controller power-save period. It is to be noted that the example of FIG. 6 is different from the example of FIG. 4. Specifically, the signals 16X and 16Y have the same duration and period as those of FIG. 4, but occur at different times than those of FIG. 4 with reference to the duty cycling of the receive circuitry 56. FIG. 6 illustrates somewhat of a worst case scenario. Specifically, in FIG. 6, the first shown transmitted signal 16X occurs during the 20-millisecond stabilization period of the 25-millisecond power ON period. Thus, the first shown signal 16X is not detected by the receive circuitry 56. However, the second shown signal 16Y is detected during the fourth power ON period (i.e., the third 10-millisecond period) of the duty cycling sequence.

It is to be appreciated that the duty cycling scheme effectively gives 85 milliseconds of seek or listen time (i.e., from initial stabilization to end of last ON period during duty cycling), while the receive circuitry 56 is actually ON for only 55 milliseconds during the duty cycling time portion. This value should be contrasted with a system that has a receive circuitry that is merely ON for 55 milliseconds after a sleep mode, and has an effective "listen" time of only 35 milliseconds. Further, because the receive circuitry 56 of the presently disclosed embodiment is in its sleep mode for 400 milliseconds, the overall power consumption is approximately 10 percent of constant full power consumption.

As mentioned above, as a means for further saving power, certain components of the function control circuitry 60 are turned OFF for the same 400-millisecond sleep period. As is shown in FIG. 6, certain components of the function control circuitry 60 are turned ON only for the 105 second duration duty cycling of the receive circuitry 56, while the receiver/controller 18 is awaiting a signal 16.

Figure 7:
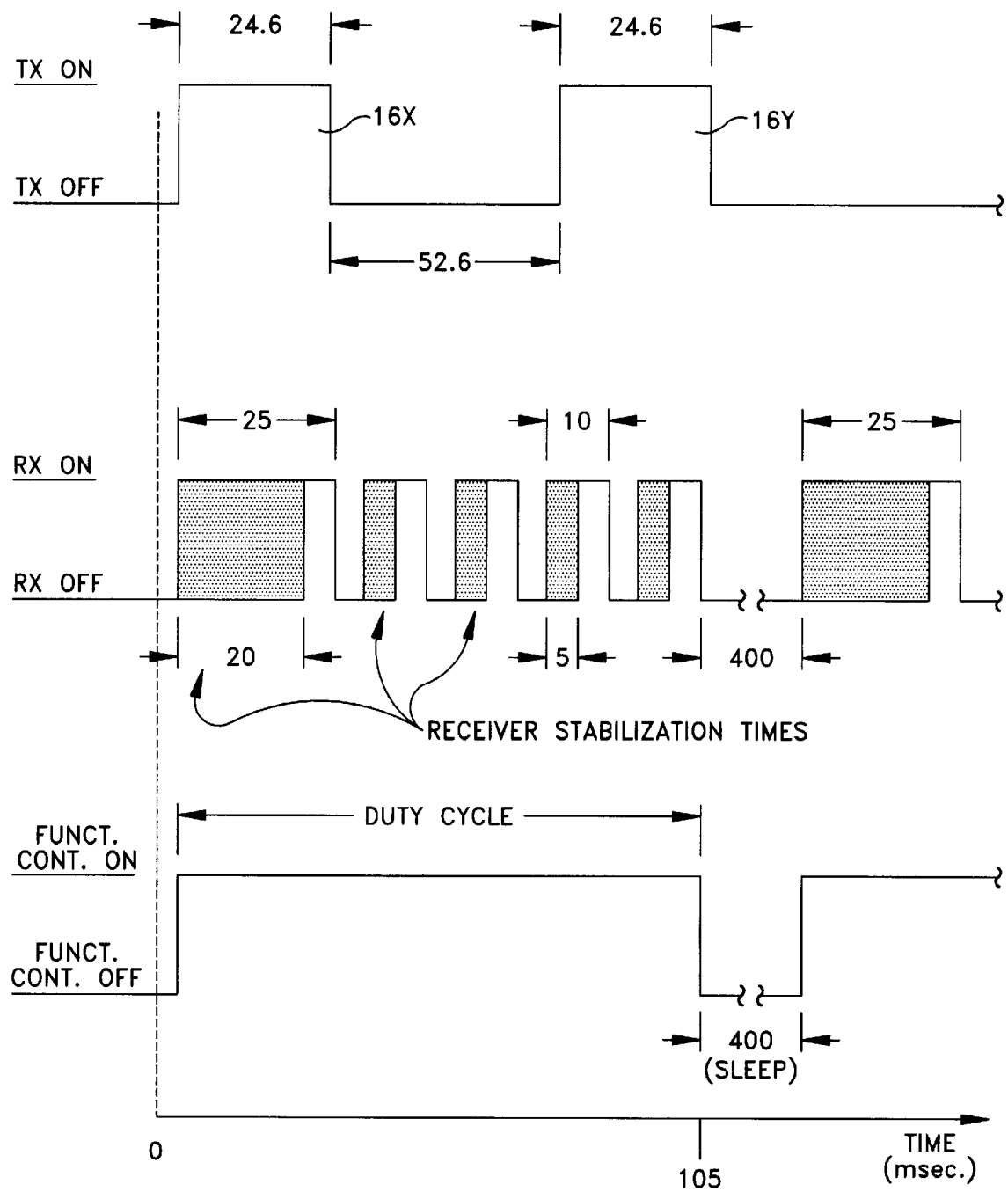
FIG. 7 is similar to FIG. 6, but for a transmitted signal that has a second transmission/dead-time period.

Different transmission duration sequences can be used. The illustration of FIG. 6 has a 17.3 millisecond signal length. This is commonly referred to as a minimum signal length. A maximum signal length of 24.6 milliseconds is shown in FIG. 7. The 24.6 millisecond signal length is accompanied by a 52.6 millisecond transmission idle time. The transmission sequence shown in FIG. 7 results in a "dead time" of approximately 68.1 milliseconds for each 100 millisecond duration (i.e., approximately 32 percent ON time). As shown in FIG. 7, the duty cycle of the receive circuitry 56 again results in detection of the signal 16 such that the receiver/controller 18 is at full power for the next subsequent transmitted signal.

Figure 8:
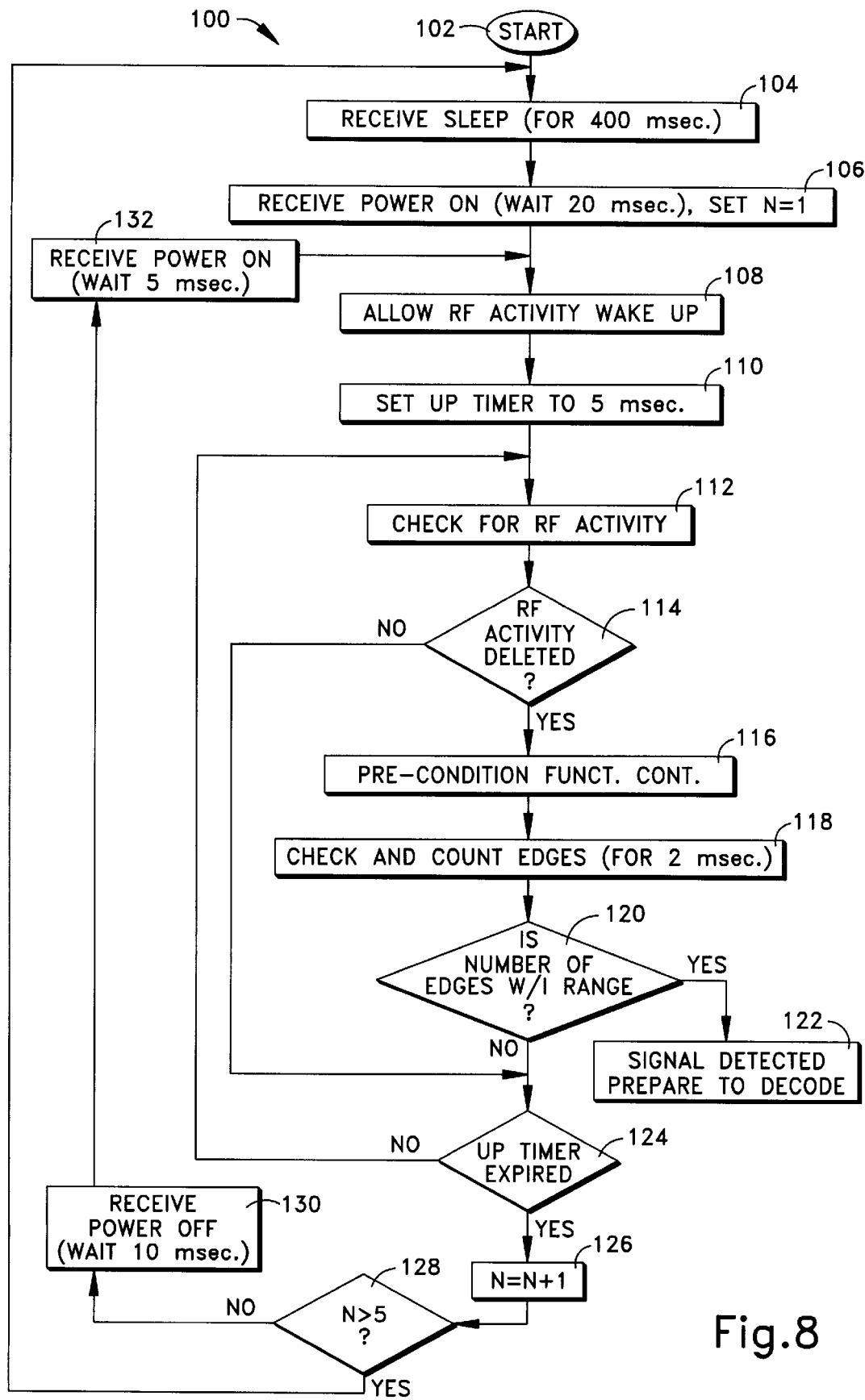
FIG. 8 is a flow chart for a process in accordance with the present invention performed within the receiver/controller of FIG. 1.

A process 100 in accordance with the present invention and performed within the receiver/controller 18 is shown in FIG. 8. The process 100 begins at step 102 and proceeds to step 104 in which the receive circuitry 56 is placed into the sleep mode for 400 milliseconds. At the end of the 400 milliseconds, the power control circuitry 62 provides power to the receive circuitry 56 at step 106. Further within step 106, a counting variable N is set to one and the function control circuitry 62 awaits the 20-millisecond stabilization period. At step 108, the function control circuitry 60 enables itself to receive a possible RF activity wake-up. In other words, after the 20-millisecond stabilization period, the function control circuitry 60 begins to check to see if the receive circuitry 56 detects the presence of the transmitted signal 16.

At step 110, an up timer is set to 5 milliseconds. At step 112, the receive circuitry 56 is "listening" for RF activity (i.e., is a transmitted signal being picked up). At step 114, the function control circuitry 60 determines whether RF activity is detected (i.e., it is determined if the receive circuitry has provided an appropriate signal to the function control circuitry). If the determination at step 114 is affirmative (i.e., a RF signal has been detected), the process 100 goes to step 116. At step 116, the microcomputer and other components of the function control circuitry 60 are preconditioned to begin processing the received signal.

Edges (e.g., leading edges) of the detected RF signal are checked and counted within a 2-millisecond time frame at step 118. It is determined whether the number of detected edges is within a predetermined range at step 120. The number of edges detected within the predetermined 2-millisecond window is indicative of the frequency of the received RF signal. Because the receiver/controller 18 only responses to the frequency of signals that may come from its associated transmitter 14, the frequency must be determined to be proper (i.e., a number of detected edges is within a predetermined range indicates a proper frequency).

If the determination at step 120 is affirmative (i.e., the number of detected edges is within the predetermined range, indicating a proper frequency signal), the process 100 goes to step 122. At step 122, the function control circuitry 60 instructs the power control circuitry 62 to provide full ON power, such that the next subsequent transmitted signal is completely received and processed. The function control circuitry 60 will process the information provided via the signal for decoding, security code comparison, and action upon the requested function within any proper signal.

If the determination at step 120 is negative (e.g., the number of detected edges is outside of the predetermined range indicative of a non-system signal), the process 100 goes to step 124. At step 124, it is determined whether the up timer has expired (i.e., whether 5 milliseconds have expired). If the determination at step 124 is negative (i.e., the timer has not yet expired and time remains within the 5 millisecond time period), the process 100 loops back to step 112.

At step 112, another check is made for RF activity. From step 112, the process 100 goes to step 114. Again, it is determined whether RF activity is detected. It should be noted that if RF activity is detected, the process 100 proceeds to step 116 as described above. However, if the determination at step 114 is negative (i.e., there is no RF activity), the process 100 jumps down to step 124. Thus, if no RF activity is present (as is determined at step 114), the steps 116–120 are skipped.

If the determination at step 124 is affirmative, the up timer has expired and the 5 millisecond time period within which the receive circuitry 56 is powered to seek the presence of the signal end has ended. Upon the affirmative determination at step 124 (i.e., up timer expired), the process 100 goes to step 126, in which the variable N is incremented by 1. At step 128, it is determined whether the variable N is greater than 5 (i.e., whether the power control circuitry has completed its 5 power ON time periods, one period of 25 milliseconds and four periods of 10 milliseconds).

If the determination at step 128 is negative (i.e., N is less than 5 and the receive circuitry 56 has not yet duty-cycled through the five power ON periods), the process 100 goes to step 130. At step 130, the power control circuitry 62 turns OFF the power to the receive circuitry 56. The 10-second power OFF period is awaited within the step 130.

Upon completion of step 130, the process 100 goes to step 132. At step 132, the power control circuitry 62 turns ON the power to the receive circuitry 56. Also within step 132, the receiver/controller 18 awaits the 5-second re-stabilization period. Upon completion of step 132, the process 100 goes to step 108. The process 100 again proceeds from step 108 through step 110, etc., with the receiver/controller 18 seeking the presence of the transmitted signal 16.

The process 100 continues with the nested loops (i.e., checking and counting edges, and powering ON/OFF the receive circuitry 56), for the duration of the 105 millisecond duty cycle time period. Of course, if at any time the proper number of edges are detected which indicate the presence of the transmitted signal, the process 100 will proceeds from step 120 to step 122 to prepare for reception, decode, etc., of the next transmitted signal.

However, once the five power ON time periods within the duty cycling time sequence are completed, the determination at step 128 will be affirmative (i.e., the variable N will equal 6 which is greater than 5). Upon the affirmative determination at step 128 (i.e., N is greater than 5), the process 100 goes to step 104. At step 104, the power control circuitry 62 turns OFF the power and places the receive circuitry 56 in another 400 millisecond sleep time period.

From the above description of the invention, those skilled in the art will perceive improvements, changes and modifications. Such improvements, changes and modifications within the skill of the art are intended to be covered by the appended claims.

Having described the invention, the following is claimed:

1. A remote convenience system for remote control of a function, said system comprising:
   a portable, actuatable transmitter for requesting performance of a remote control function; and
   a receiver/controller for causing performance of the requested function, within a response period of predetermined duration that begins upon transmitter actuation, in response to a received function request;
   said transmitter including means for transmitting signals conveying a function request during first portions of repeating, predetermined duration, request periods and for idling during second portions of the request periods;
   said receiver/controller including receiver means having an ON state for detecting and receiving transmitted signals and an OFF state, and power control means for maintaining said receiver means in the OFF state for a first portion of a repeating, predetermined duration, power-save period and for cycling said receiver means between the ON and OFF states in a sequence for a second portion of the power-save period such that said receiver means is eventually in the ON state during one of the first portions of one of the request periods of said transmitter and that one of the transmitted signal is detected, and said power control means for maintaining said receiver means in the ON state once said receiver means detects a signal such that a next subsequent signal is received and the requested function performed within the response time period.

2. A system as set forth in claim 1, wherein said power control means includes means for controlling the ON and OFF states of said receiver means such that said receiver means is in its ON state approximately 10 percent of the time during the power-save period.

3. A system as set forth in claim 1, wherein said power control means includes means for controlling the ON and OFF states of said receiver means during the second portion of the power-save period such that the duration of each ON state of said receiver means is of sufficient duration to allow said receiver means to stabilize during each ON state.

4. A system as set forth in claim 1, wherein said power control means includes means for controlling the ON and OFF states of said receiver means during the second portion of the power-save period such a first ON state of said receiver means is approximately 25 milliseconds in duration, each OFF state is approximately 10 milliseconds in duration, and each subsequent ON state is approximately 10 milliseconds in duration.

5. A system as set forth in claim 1, wherein said power control means includes means for controlling the OFF state of said receiver means during the first portion of the power-save period such that the first portion of the power-save period is approximately 400 milliseconds in duration, and for controlling the ON and OFF states of the receiver means during the second portion of the power-save period such that the second portion of the power-save period is approximately 105 milliseconds in duration.

6. A system as set forth in claim 1, wherein said means for transmitting includes means for transmitting during approximately 32 percent of each request period.

7. A method of remotely controlling a remote convenience function, said method comprising:
   remotely requesting performance of a remote control function, including transmitting signals conveying a function request during first portions of repeating, predetermined duration, request periods and idling during second portions of the request periods;
   maintaining a receiver means in a power OFF state for a first, predetermined portion of a repeating, predetermined duration, power-save period;
   cycling the power of the receiver means ON and OFF in a sequence for a second, predetermined portion of the power-save period such that the power of the receiver means is eventually in the ON during one of the first portions of one of the request periods;
   detecting the presence of a signal when the power of the receiver means is eventually cycled ON during one of the first portions of one of the request periods;
   maintaining the power of the receiver means ON in response to the detection, such that a next subsequent signal is received; and
   causing performance of the requested function within a predetermined duration response period that begins upon the beginning of the signal transmission.

8. A method as set forth in claim 7, wherein said steps of maintaining the receiver means in the power OFF state and cycling the power of the receiver means ON and OFF include controlling the power to the receiver means such that the power of the receiver means is ON approximately 10 during the power-save period.

9. A method as set forth in claim 7, wherein said step of cycling the power of the receiver means ON and OFF includes controlling the power of the receiver means such that the duration of each power ON state of the receiver means is of sufficient duration to allow the receiver means to stabilize during each power ON state.

10. A method as set forth in claim 7, wherein said step of cycling the power of the receiver means ON and OFF includes controlling the power of the receiver means such that the duration of a first power ON state of the receiver means is approximately 25 milliseconds in duration, each power OFF state is approximately 10 milliseconds in duration and each subsequent power ON state is approximately 10 milliseconds in duration.

11. A method as set forth in claim 7, wherein said steps of maintaining the receiver means in the power OFF state and cycling the power of the receiver means ON and OFF include controlling the power of the receiver means such that the first portion of the power-save period is approximately 400 milliseconds in duration, and the second portion of the power-save period is approximately 105 milliseconds in duration.

12. A method as set forth in claim 7, wherein said step of transmitting signals includes transmitting the signals during approximately 32 percent of the request period.

* * * * *